(12) United States Patent
Yanaka et al.

(10) Patent No.: US 11,958,537 B2
(45) Date of Patent: Apr. 16, 2024

(54) VEHICLE

(71) Applicant: TOYOTA JIDOSHA KABUSHIKI KAISHA, Toyota (JP)

(72) Inventors: Akihiro Yanaka, Nagoya (JP); Shinji Kurachi, Kariya (JP); Hidenori Iwayama, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 336 days.

(21) Appl. No.: 17/531,052

(22) Filed: Nov. 19, 2021

(65) Prior Publication Data

US 2022/0161863 A1    May 26, 2022

(30) Foreign Application Priority Data

Nov. 24, 2020  (JP) ................................ 2020-194171

(51) Int. Cl.
*B62D 25/10* (2006.01)
*B60R 21/34* (2011.01)
*B62D 21/15* (2006.01)

(52) U.S. Cl.
CPC ............. *B62D 25/10* (2013.01); *B60R 21/34* (2013.01); *B62D 21/15* (2013.01); *B60R 2021/343* (2013.01)

(58) Field of Classification Search
CPC ........ B62D 25/10; B62D 21/15; B60R 21/34; B60R 2021/343
USPC ........................................................ 180/69.2
See application file for complete search history.

(56) References Cited

U.S. PATENT DOCUMENTS

| 5,706,908 A | 1/1998 | Sakai et al. |
| 8,052,198 B2 * | 11/2011 | Seksaria ............... B62D 25/105 |
| | | 296/193.11 |
| 10,155,546 B2 * | 12/2018 | Kashima ................ B62D 25/12 |
| 11,097,785 B2 * | 8/2021 | Lein ........................ B60R 21/34 |

(Continued)

FOREIGN PATENT DOCUMENTS

| JP | H07285466 A | 10/1995 |
| JP | 2018-203025 A | 12/2018 |
| JP | 2018203025 A * | 12/2018 |

(Continued)

OTHER PUBLICATIONS

English Translation of WO2012096244A1 accessed at www.espacenet.com on Dec. 12, 2023. (Year: 2012).*

(Continued)

*Primary Examiner* — James A Shriver, II
*Assistant Examiner* — Hilary L Johns
(74) *Attorney, Agent, or Firm* — Dinsmore & Shohl LLP

(57) ABSTRACT

A vehicle includes a hood. The hood includes a hood outer and a hood inner. The hood inner has a plate shape, covers a lower surface of the hood outer, and is made of resin. A space is provided between the hood outer and the hood inner. The hood inner includes a shock absorbing portion that is bent so as to project toward the space. The shock absorbing portion has a central portion located at a center of the shock absorbing portion in a right-left direction of the vehicle and side portions located on respective sides of the central portion in the right-left direction. A thickness of the hood inner in the central portion is thicker than a thickness of the hood inner in the side portions.

5 Claims, 5 Drawing Sheets

(56) References Cited

U.S. PATENT DOCUMENTS

2010/0140979 A1\* 6/2010 Seksaria .............. B62D 29/002
                                                    296/193.11
2021/0016839 A1\* 1/2021 Lein ..................... B62D 29/005

FOREIGN PATENT DOCUMENTS

WO      2012/096244 A1    7/2012
WO      WO-2012096244 A1 \*  7/2012  ............. B60R 21/34

OTHER PUBLICATIONS

English Translation of JP 2018203025 A accessed at www.espacenet.com on Dec. 12, 2023. (Year: 2018).\*

\* cited by examiner

VEHICLE

CROSS-REFERENCE TO RELATED APPLICATION

This application claims priority to Japanese Patent Application No. 2020-194171 filed on Nov. 24, 2020, incorporated herein by reference in its entirety.

BACKGROUND

1. Technical Field

The technique disclosed in the present specification relates to a vehicle provided with a hood.

2. Description of Related Art

A vehicle disclosed in Japanese Unexamined Patent Application Publication No. 7-285466 (JP 7-285466 A) includes a hood that covers a compartment. The hood includes a hood outer and a hood inner. The hood inner covers a lower surface of the hood outer. A space is provided between the hood outer and the hood inner. A shock absorber is provided in the space. When an object collides with the hood, the shock absorber is compressed to absorb the shock. This alleviates the shock applied to the object.

SUMMARY

In a structure in which the shock absorber is provided in the space between the hood inner and the hood outer as in JP 7-285466 A, it is difficult to visually check the shock absorber from the outside after the hood is assembled, and a sufficient shock absorption performance may not be ensured when a position misalignment, etc. occurs with the shock absorber. The present specification proposes a new hood structure capable of absorbing a shock.

A vehicle disclosed in the present specification includes a hood. In the vehicle, the hood includes a hood outer and a hood inner. The hood inner has a plate shape, covers a lower surface of the hood outer, and is made of resin. A space is provided between the hood outer and the hood inner. The hood inner includes a shock absorbing portion that is bent so as to project toward the space. The shock absorbing portion has a central portion located at a center of the shock absorbing portion in a right-left direction of the vehicle and side portions located on respective sides of the central portion in the right-left direction. A thickness of the hood inner in the central portion is thicker than a thickness of the hood inner in the side portions.

In this vehicle, a space is provided between the hood outer and the hood inner, and the shock absorbing portion is composed of a portion of the hood inner that is bent so as to project toward the space. When an object collides with the hood, the shock absorbing portion is compressed to absorb the shock. As described above, the shock absorbing portion is composed of the bent portion provided in the hood inner. Therefore, the shock absorbing portion can be visually checked after the hood is assembled, and thus an abnormality is less likely to occur in the shock absorbing portion. Therefore, a sufficient shock absorbing capacity can be secured with the shock absorbing portion. Further, the thickness of the hood inner in the central portion of the shock absorbing portion is thicker than the thickness of the hood inner in the side portion. Therefore, the side portion is more easily crushed than the central portion. Accordingly, when an object collides with the hood, the side portion is likely to be crushed before the central portion. With this configuration, the object that collides with the hood can be displaced from the central portion toward the side close to the side portion. With this configuration, it is possible to suppress the object from colliding with a vehicle component in proximity of the central portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an example vehicle disclosed in the present specification, the hood inner may be bent so as to project forward in the shock absorbing portion. The hood inner may have a front side portion extending forward from a lower end of the shock absorbing portion. A part of the front side portion may be disposed below a front end of the shock absorbing portion with a clearance from the front end.

With this configuration, when a shock is applied to the shock absorbing portion from above, the shock absorbing portion is easily crushed and the shock absorbing portion easily absorbs a shock energy.

In an example vehicle disclosed in the present specification, an upper surface of the shock absorbing portion may have a ridgeline extending in the right-left direction.

With this configuration, when an object collides with the hood, the shock is likely to be applied first to the position of ridgeline of the shock absorbing portion. As described above, the position where the shock is first applied can be controlled. Therefore, the shock absorbing portion is easily crushed appropriately. Accordingly, the shock absorbing portion easily absorbs a collision energy.

In the example vehicle disclosed in the present specification, the ridgeline may be curved such that a portion of the ridgeline in the central portion is located forward of portions of the ridgeline in the side portions in a front-rear direction of the vehicle.

With this configuration, when the shock absorbing portion is crushed, the object colliding with the hood can be easily displaced in the direction away from a vehicle component provided behind the central portion. Therefore, it is possible to suppress the object that has collided with the hood from colliding with the vehicle component.

In an example vehicle disclosed in the present specification, an upper surface of the shock absorbing portion may have a ridgeline extending in a right-left direction. The ridgeline may be disposed forward of the lower end of the shock absorbing portion.

With this configuration, the ridgeline is located above a clearance between the shock absorbing portion and the front side portion. Therefore, the clearance between the shock absorbing portion and the front side portion is easily crushed. Accordingly, it is easy to absorb more collision energy.

The example vehicle disclosed in the present specification may have a protrusion behind the central portion.

With this configuration, it is possible to suppress the object that has collided with the vehicle from colliding with the protrusion.

Figure 1:
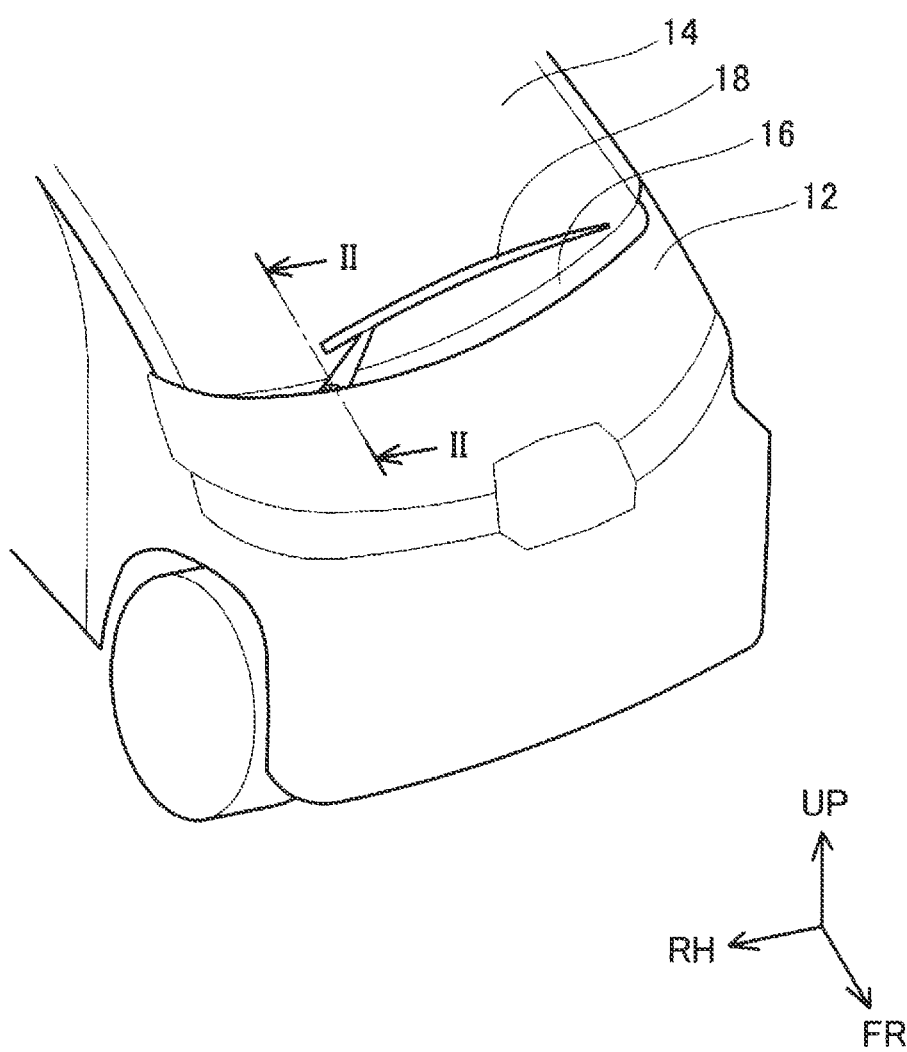
FIG. 1 is a perspective view of a vehicle.

A vehicle 10 according to an embodiment shown in FIG. 1 is an electric vehicle that travels using a driving force of a motor. In each diagram including FIG. 1, the arrow FR indicates the front side of the vehicle, the arrow RH indicates the right side of the vehicle, and the arrow UP indicates the upper side of the vehicle. The vehicle 10 includes a hood 12, a windshield 14, and a cowl top 16. The hood 12 covers an upper surface of the vehicle 10 in front of the windshield 14. A compartment that accommodates the motor and other components is provided below the hood 12. The hood 12 can be opened and closed. The cowl top 16 covers the area between the hood 12 and the windshield 14. A wiper 18 is installed on the cowl top 16.

Figure 2:
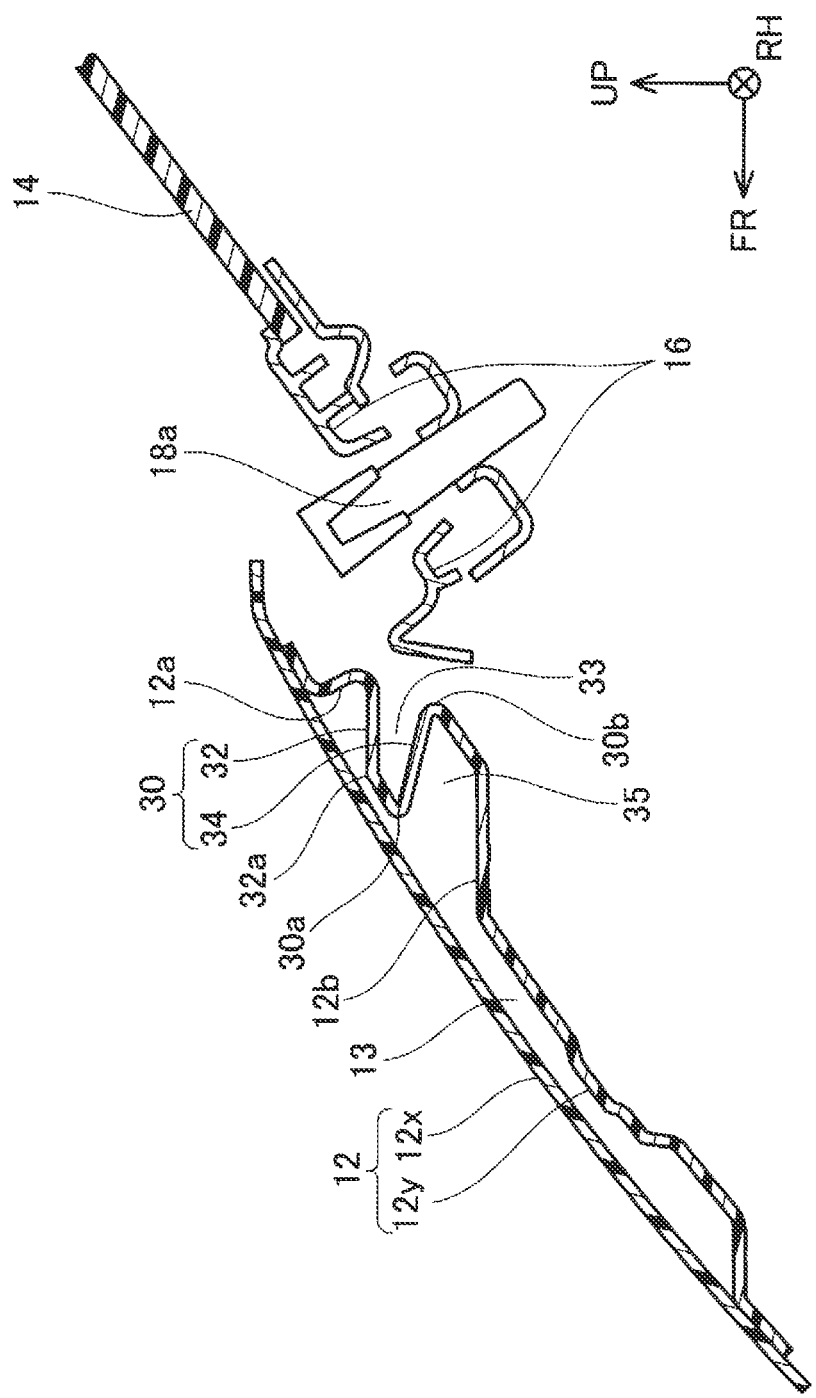
FIG. 2 is a sectional view taken along the line II-II shown in FIG. 1.

FIG. 2 shows a section taken at the position of line II-II shown in FIG. 1. As shown in FIG. 2, the cowl top 16 is provided with a rotating shaft 18a of the wiper 18. An upper end of the rotating shaft 18a projects upward from the cowl top 16.

A rear end of the hood 12 covers a front end of the cowl top 16. The hood 12 includes a hood outer 12x and a hood inner 12y. The hood outer 12x is a member having a plate shape, and constitutes a portion of the hood 12 that is exposed on the surface of the vehicle 10. The hood outer 12x is made of resin. The hood inner 12y is a member having a plate shape, and is fixed to an inner surface (that is, a lower surface) of the hood outer 12x. The hood inner 12y covers substantially the entire inner surface of the hood outer 12x. The hood inner 12y is made of resin. A space 13 is provided between the hood outer 12x and the hood inner 12y.

The hood inner 12y has a shock absorbing portion 30 that is bent so as to project toward the space 13 (that is, toward the hood outer 12x). The shock absorbing portion 30 has an upper plate 32 and a lower plate 34. Further, the hood inner 12y has an upper end portion 12a and a front side portion 12b. The upper end portion 12a constitutes an upper end of the hood inner 12y and is fixed to the hood outer 12x. The upper plate 32 extends forward from the upper end portion 12a. A front end of the upper plate 32 is a front end 30a of the shock absorbing portion 30. The lower plate 34 is connected to the upper plate 32 at the front end 30a. The hood inner 12y is sharply bent at the front end 30a, and the lower plate 34 extends diagonally downward from the front end 30a toward the rear side. Therefore, the lower plate 34 is disposed below the upper plate 32. Except for the front end 30a, a clearance 33 is provided between the upper plate 32 and the lower plate 34. A lower end of the lower plate 34 is a lower end 30b of the shock absorbing portion 30. The front side portion 12b is connected to the lower plate 34 at the lower end 30b. The hood inner 12y is sharply bent at the lower end 30b, and the front side portion 12b extends forward from the lower end 30b. Therefore, a part of the front side portion 12b is disposed below the lower plate 34. Except for the lower end 30b, a clearance 35 is provided between the portion of the front side portion 12b disposed below the lower plate 34 and the lower plate 34. That is, a part of the front side portion 12b is disposed below the front end 30a of the shock absorbing portion 30 with the clearance 35 from the front end 30a. A front end portion (that is, a lower end portion) of the front side portion 12b is fixed to the hood outer 12x.

The upper plate 32 and the lower plate 34 are configured as described above. Therefore, the shock absorbing portion 30 protrudes toward the space 13 (that is, toward the hood outer 12x) with respect to the upper end portion 12a and the lower end 30b. The shock absorbing portion 30 projects forward with respect to the upper end portion 12a and the lower end 30b.

Figure 3:
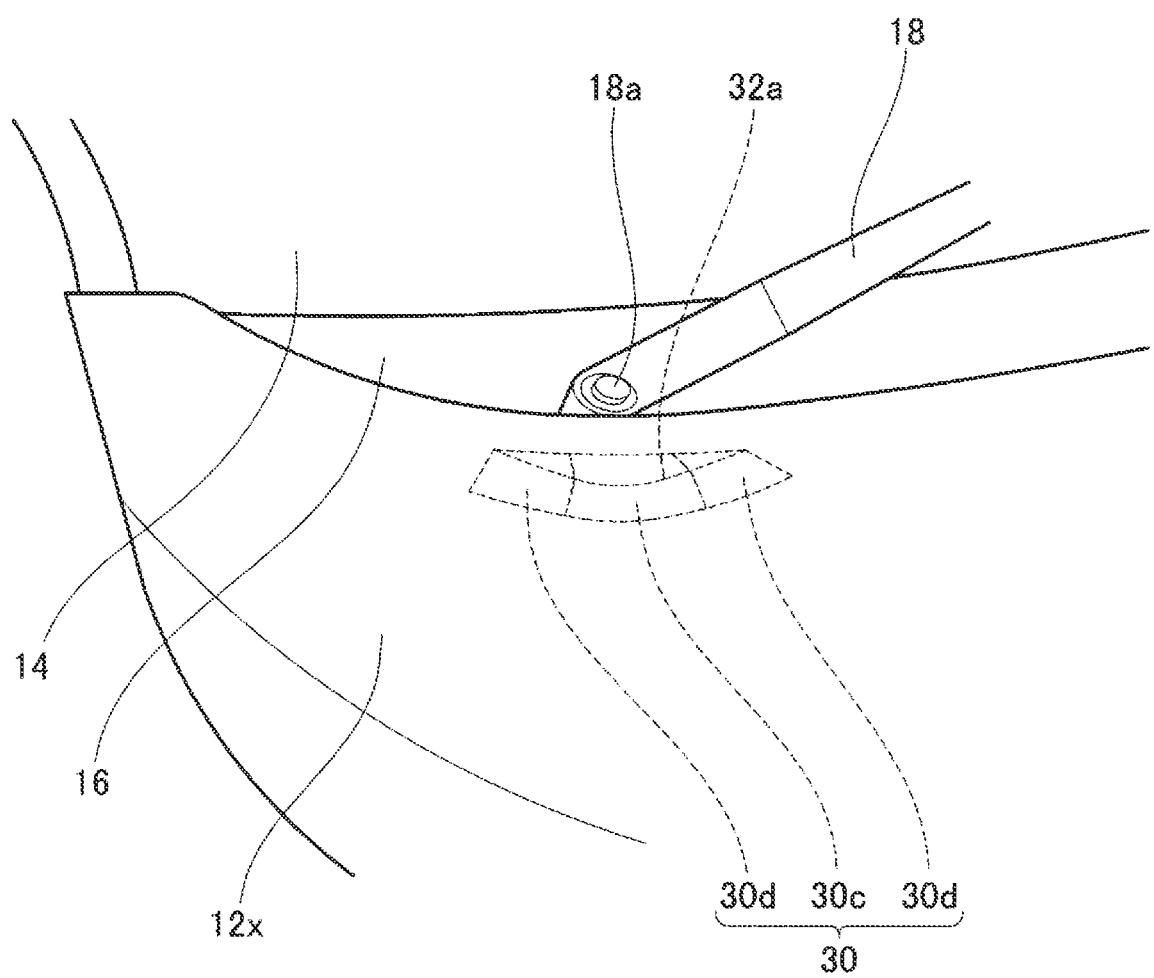
FIG. 3 is a perspective view of a shock absorbing portion as viewed from the outside of the vehicle.

FIG. 3 is a view of the shock absorbing portion 30 as viewed from the outside of the vehicle 10. FIG. 3 shows the shock absorbing portion 30 in a state where the hood outer 12x is seen through. As shown in FIGS. 2 and 3, the shock absorbing portion 30 is disposed forward of the rotating shaft 18a of the wiper 18. The shock absorbing portion 30 has a central portion 30c located at the center of the shock absorbing portion 30 in the right-left direction of the vehicle 10 and two side portions 30d located on respective sides of the central portion 30c in the right-left direction of the vehicle 10. The width of the shock absorbing portion 30 in the front-rear direction of the vehicle 10 is wide at the central portion 30c and narrow at each side portion 30d. The rotating shaft 18a of the wiper 18 is disposed behind the central portion 30c. A ridgeline 32a is provided on an upper surface of the shock absorbing portion 30 (that is, an upper surface of the upper plate 32). As shown in FIG. 2, the ridgeline 32a is composed of a bent portion of the upper plate 32. As shown in FIG. 3, the ridgeline 32a extends in the right-left direction of the vehicle 10. The ridgeline 32a is curved such that a portion of the ridgeline 32a in the central portion 30c is located forward of a portion of the ridgeline 32a in each side portion 30d. As shown in FIG. 2, the ridgeline 32a is disposed forward of the lower end 30b of the shock absorbing portion 30. That is, the ridgeline 32a is disposed above the clearance 35. The thickness of the hood inner 12y is thicker in the central portion 30c than in each side portion 30d. Therefore, the central portion 30c has a higher rigidity than each side portion 30d. Note that, the thickness of the hood inner 12y gradually changes at boundaries between the central portion 30c and the respective side portions 30d.

Figure 4:
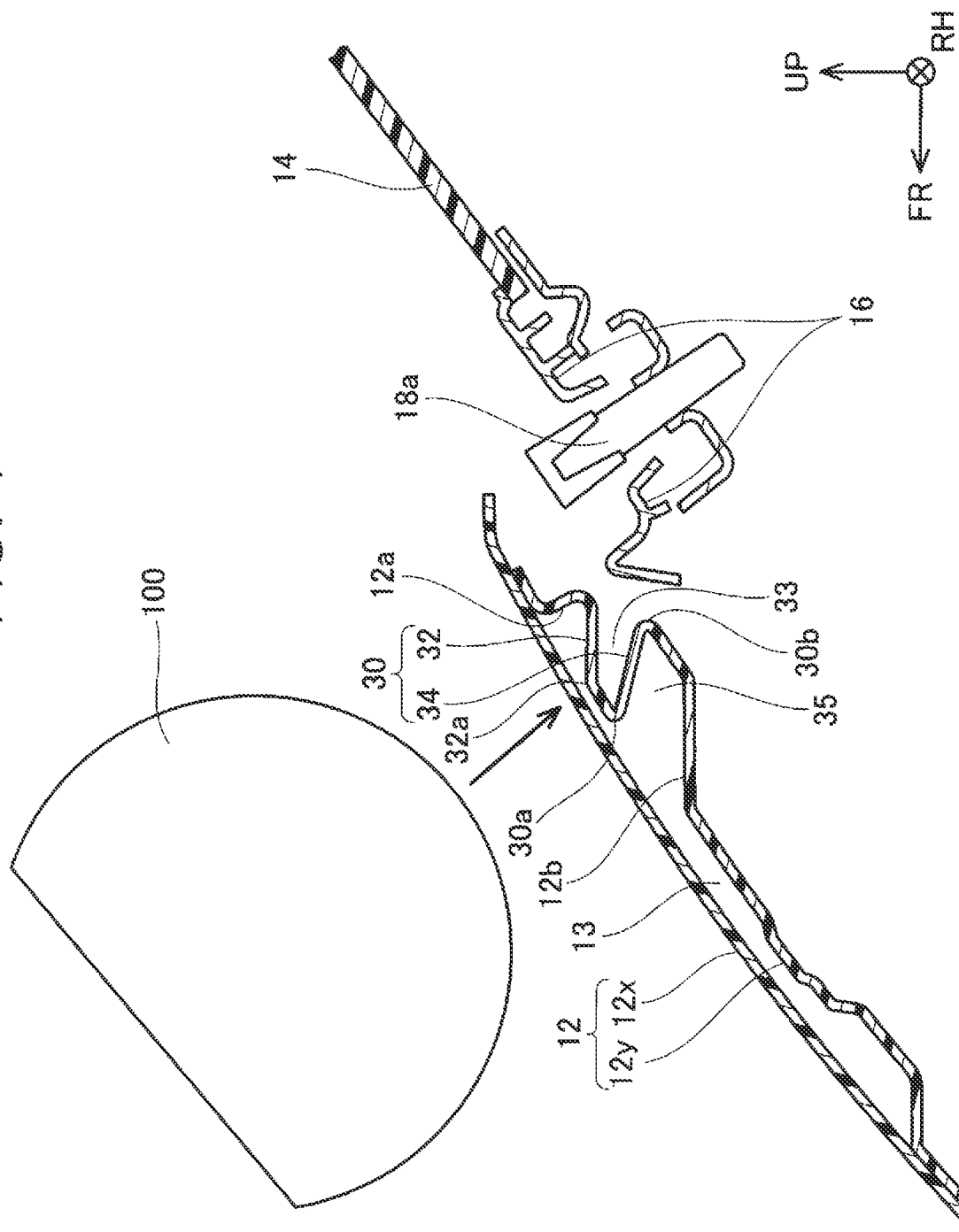
FIG. 4 is a sectional view showing a collision of an impactor.
Figure 5:
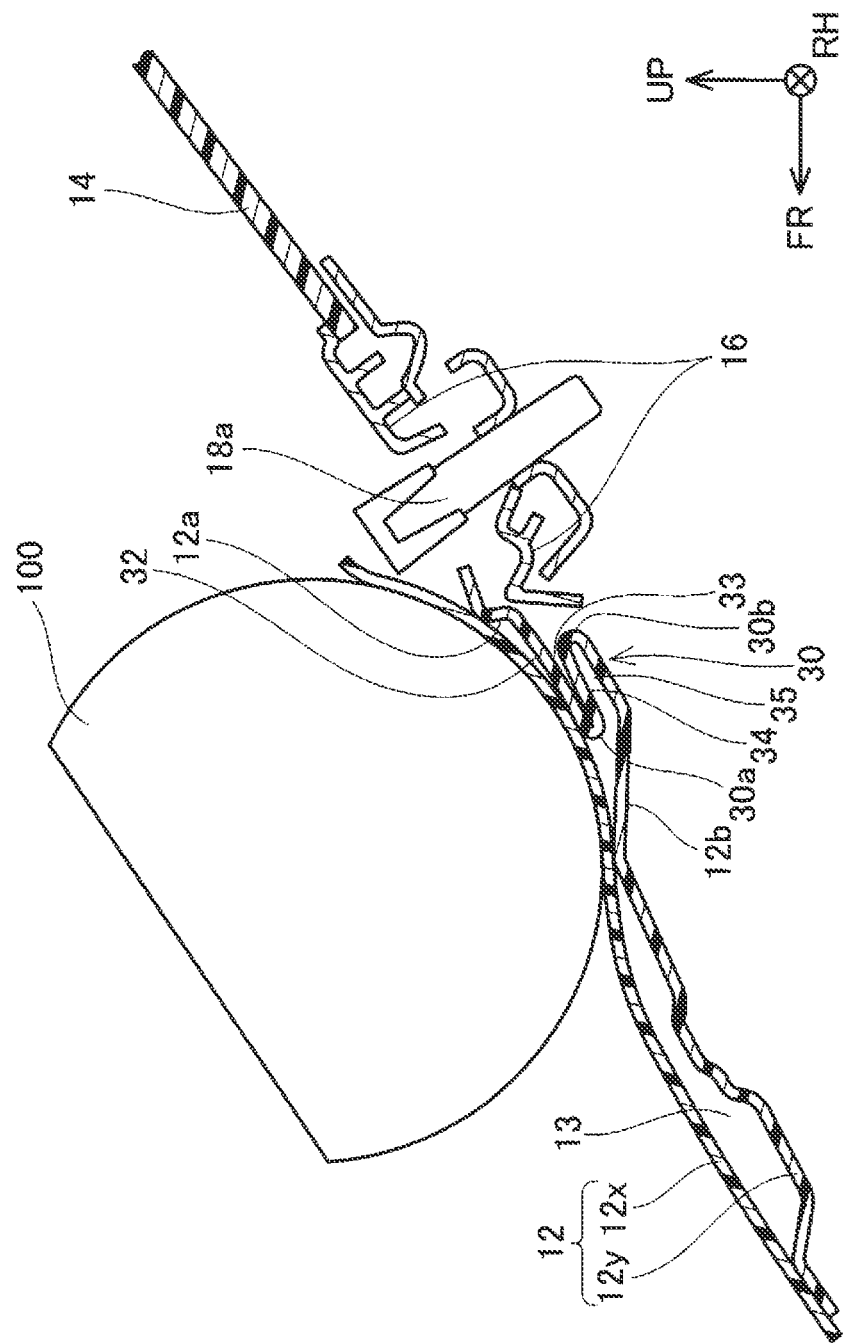
FIG. 5 is a sectional view showing the collision of the impactor.

When the vehicle 10 goes through a frontal collision, an object (for example, a pedestrian) may collide with the hood 12. An impactor 100 shown in FIGS. 4 and 5 is a test device that simulates collision of the object with the hood 12. The shock absorbing ability of the shock absorbing portion 30 can be tested through collision of the impactor 100 with the hood 12. FIGS. 4 and 5 show a case where the impactor 100 collides with the hood 12 above the shock absorbing portion 30. As shown in FIGS. 4 and 5, when the impactor 100 collides with the hood 12, the shock absorbing portion 30 is crushed such that the clearances 33, 35 are narrowed. When the shock absorbing portion 30 is crushed as described above, the shock absorbing portion 30 absorbs the shock. This alleviates the shock applied to the impactor 100.

As described above, the ridgeline 32a is provided on the upper surface of the shock absorbing portion 30. Therefore, when the hood outer 12x is deformed toward the hood inner 12y side due to the collision of the impactor 100, the hood outer 12x tends to first collide with the shock absorbing portion 30 at the ridgeline 32a. Providing the ridgeline 32a as described above makes it possible to control the location where the shock is first applied to the shock absorbing portion 30 to be in the vicinity of the ridgeline 32a. With this configuration, the shock absorbing portion 30 is easily deformed as designed, and the shock absorbing portion 30 can appropriately absorb the shock.

Further, the ridgeline 32a is disposed above the clearance 35. Therefore, when a shock is applied to the ridgeline 32a, the clearance 35 is crushed and the shock absorbing portion 30 is inclined forward as shown in FIG. 5. When the shock absorbing portion 30 is inclined forward, the impactor 100 is inclined and the collision position of the impactor 100 is likely to shift forward. With this configuration, it is possible to suppress the impactor 100 from colliding with the rotating shaft 18a of the wiper 18. In particular, the ridgeline 32a is curved such that a portion of the ridgeline 32a in the central portion 30c is located forward of a portion of the ridgeline 32a in each side portion 30d. With this configuration, the ridgeline 32a extends along the periphery of the rotating shaft 18a of the wiper 18. Therefore, when a shock is applied from the impactor 100 to the ridgeline 32a and the shock absorbing portion 30 is crushed, the impactor 100 tends to move in the direction away from the rotating shaft 18a. With this configuration, it is possible to suppress the impactor 100 from colliding with the rotating shaft 18a of the wiper 18.

Further, as described above, the thickness of the hood inner 12y is thicker in the central portion 30c than in each side portion 30d. Therefore, when a shock is applied to the vicinity of the boundary between the central portion 30c and each of the side portions 30d, the side portion 30d is likely to be crushed before the central portion 30c. Therefore, the impactor 100 that collides with the hood outer 12x tends to move laterally so as to be away from the rotating shaft 18a. With this configuration, it is possible to suppress the impactor 100 from colliding with the rotating shaft 18a of the wiper 18.

As described above, according to the vehicle 10 of the embodiment, the shock absorbing portion 30 can alleviate the shock applied to the impactor 100 and suppress the impactor 100 from colliding with the rotating shaft 18a of the wiper 18. That is, when an object (for example, a pedestrian) collides with the hood 12, the shock applied to the object can be alleviated and the object can be suppressed from colliding with the rotating shaft 18a. Further, the shock absorbing portion 30 is composed of the bent portion provided in the hood inner 12y. Therefore, the shock absorbing portion 30 can be visually checked after the hood 12 is assembled. Accordingly, the shock absorbing portion 30 can be appropriately disposed when the hood 12 is assembled, and the shock absorbing portion 30 can more reliably absorb the shock.

In the above-described embodiment, the protrusion disposed behind the shock absorbing portion 30 is the rotating shaft 18a of the wiper 18. However, the protrusion disposed behind the shock absorbing portion 30 may be another protrusion (for example, an injection nozzle that injects a cleaning liquid toward the windshield 14).

Further, in the above-described embodiment, the thickness of the hood inner 12y may be constant or the thickness of the hood inner 12y may vary inside each of the central portion 30c and the side portions 30d. For example, either of the upper plate 32 or the lower plate 34 may be thicker than the other.

Although the embodiment has been described in detail above, the embodiment is merely an example and does not limit the scope of claims. The techniques described in the claims include various modifications and variations of the specific example illustrated above. The technical elements described in the present specification or the drawings exhibit technical usefulness alone or in various combinations, and are not limited to the combinations described in the claims at the time of filing. In addition, the techniques illustrated in the present specification or drawings achieve a plurality of objectives at the same time, and achieving one of the objectives itself has technical usefulness.

What is claimed is:

1. A vehicle provided with a hood, the vehicle comprising:
a hood outer; and
a hood inner that has a plate shape, covers a lower surface of the hood outer, and is made of resin, wherein:
a space is provided between the hood outer and the hood inner;
the hood inner includes a shock absorbing portion that is bent so as to project toward the space;
the shock absorbing portion has a central portion located at a center of the shock absorbing portion in a right-left direction of the vehicle and side portions located on respective sides of the central portion in the right-left direction;
a thickness of the hood inner in the central portion is thicker than a thickness of the hood inner in the side portions;
the hood inner is bent so as to protrude forward in the shock absorbing portion;
the hood inner has a front side portion extending forward from a lower end of the shock absorbing portion; and
a part of the front side portion is disposed below a front end of the shock absorbing portion with a clearance from the front end.

2. The vehicle according to claim 1, wherein an upper surface of the shock absorbing portion has a ridgeline extending in the right-left direction.

3. The vehicle according to claim 2, wherein the ridgeline is curved such that a portion of the ridgeline in the central portion is located forward of portions of the ridgeline in the side portions in a front-rear direction of the vehicle.

4. The vehicle according to claim 1, wherein:
an upper surface of the shock absorbing portion has a ridgeline extending in the right-left direction; and
the ridgeline is disposed forward of the lower end of the shock absorbing portion.

5. The vehicle according to claim 1, further comprising a protrusion disposed behind the central portion.

* * * * *